May 29, 1923.
K. B. HARVEY
AUTO TABLE
Filed Oct. 26, 1921
1,457,028
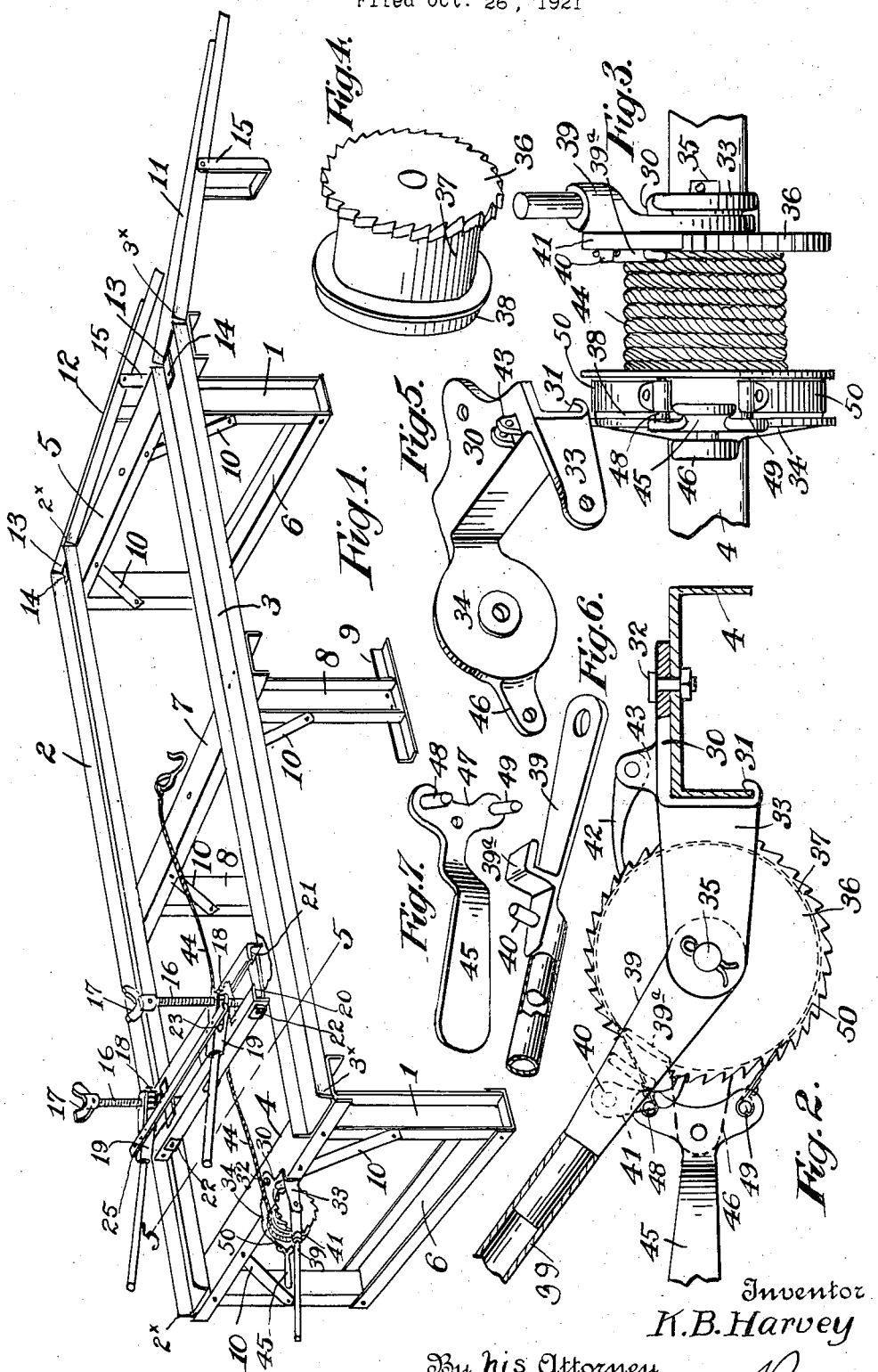
Inventor
K.B.Harvey
By his Attorney
Wm H. Reid Patented May 29, 1923.                                   1,457,028

UNITED STATES PATENT OFFICE.

KELLY B. HARVEY, OF NEW YORK, N. Y.

AUTO TABLE.

Application filed October 26, 1921. Serial No. 510,523.

*To all whom it may concern:*

Be it known that I, KELLY B. HARVEY, a citizen of the United States, and a resident of New York city, in the county of New York and State of New York, have invented certain new and useful Improvements in Auto Tables, of which the following is a specification.

The object of the present invention is to provide an apparatus that will permit an automobile of any kind to be placed on a support elevated a few feet above the ground or floor, which vehicle can be caused to run up thereon by an incline, by a windlass on the apparatus to facilitate inspection and operation of the vehicle.

In the accompanying drawing showing one embodiment of my invention, Figure 1 is a perspective view thereof.

Fig. 2 shows enlarged the capstan device in side elevation.

Fig. 3 is a section of the same.

Figs. 4, 5, 6 and 7 are detailed parts of the same.

As shown I provide a frame member comprising an angular part 30 having a bent flange 31 adapted to engage the channel bar 4 as shown in Fig. 2 by the flange, and a single bolt 32, passes through the angle piece and the top of the channel bar 4 which forms a ready means of attachment, and by loosening this bolt the entire device can be transferred to the other end bar 5 or middle bar 15. This frame includes side bars 33 and 34 suitably apertured to receive a shaft 35 on which turns a ratchet wheel 36. The latter is connected by a cable drum 37, with a brake drum 38 which three parts can be integral and rotate between the side pieces 34 and 33. A ratchet lever 39 swings loose on the shaft 35 and carries a pin 40 on which rocks a gravity pawl 41, that will engage the ratchet wheel 36. Obviously the downward movement of the lever will turn the ratchet wheel and drum 38, while reverse movement will be free and the pawl will ride over the teeth. A special gravity pawl 42 is carried by ears 43 on the angle piece 30 and will prevent reverse movement of the ratchet wheel 36 on reverse swing of the lever 39. The winding drum 37 has a cable 44 secured thereto that will be wound up by oscillation of the lever 39.

I also provide a brake lever 45 pivoted on an extension 46 of the side plate 34 of the frame. This lever has a cross arm 47 that carries pins 48 and 49 on opposite sides of this center of swing. A brake band 50 is passed around the drum 38 that is pivoted on the pins 48 and 49 as shown. When the brake lever 45 is swung in either direction from its normal position the brake band will be tightened and grip the brake drum to retard the movement of the winding drum. When it is desired to let the cable unwind slowly as when the car is being run down the incline, the winding lever 39 is advanced to release the pawl 42 that is swung back, and then the brake lever can permit the drum to unwind slowly at any desired speed under positive control when the car runs down the incline. An arm 39$^a$ on the lever 39 is passed around the wheel 36 to retain the lever in working position.

A device of this kind being formed chiefly from channel bars is easily and cheaply constructed yet will be strong and rigid to support the vehicle. The tandem jacks can be used to raise the rear axle or the front axle or can engage the frame where desired.

The auto table on which the winding device is especially designed to be used, is formed of structural elements and in the arrangement shown in Fig. 1, comprises a pair of bars 2 and 3 of inverted channel form secured at their ends to inverted channel bars 4 and 5; which are supported at their ends by upright bars 1. At one end of the table is provided inclined bars 11 and 12 of channel form, extending from the ends of the bars 2 and 3 down to the ground or floor; thus forming a runway up which the auto can be drawn by the cable 44 as wound around the winding drum when turned by the lever as described.

What I claim is:

1. The combination with a structural bar having a top plate and a depending flange, of an angle plate bracket for a hoisting device consisting of a flat top plate arranged to extend along the top of said bar, and an upright plate depending from the front longitudinal edge of the top plate which has its lower edge extending rearward and upward to hook around the lower edge of the bar flange with the top plate resting on top of the bar, means for directly securing the top plate to the structural bar, said depending plate being provided with bars extending forward at each end that are arranged to act as journal bearings for a shaft that carries a winding drum and a lever.

2. The combination with a structural bar having a top plate and a depending flange, of an angle plate bracket consisting of a flat top plate arranged to extend along the top of said bar, and an upright plate depending from the front longitudinal edge of the top plate which has its lower edge extending rearward and upward to hook around the lower edge of the bar flange with the top plate resting on top of the bar, means for directly securing the top plate to the structural bar, said depending plate being provided with bars extending forward at each end that are arranged as journal bearings, a shaft mounted in said bearings that carries a winding drum and a lever between said bearings, one of said forward extending bars having an extension, a brake lever mounted in said extension and carrying a brake band engaging the winding drum.

Signed at New York city, N. Y., on October 1st, 1921.

KELLY B. HARVEY.